(12) United States Patent
Tom

(10) Patent No.: US 7,937,751 B2
(45) Date of Patent: May 3, 2011

(54) UNIVERSAL DEVICE ID REGISTRY, BACK-END, AND SELF-VERIFICATION ARCHITECTURE

(75) Inventor: Alfred Tom, Lafayette, CA (US)

(73) Assignee: Kantan Inc., San Francisco, CA (US)

( * ) Notice: Subject to any disclaimer, the term of this patent is extended or adjusted under 35 U.S.C. 154(b) by 63 days.

(21) Appl. No.: 11/920,801

(22) PCT Filed: May 19, 2006

(86) PCT No.: PCT/US2006/019486
§ 371 (c)(1),
(2), (4) Date: Nov. 20, 2007

(87) PCT Pub. No.: WO2006/127475
PCT Pub. Date: Nov. 30, 2006

(65) Prior Publication Data
US 2009/0132746 A1    May 21, 2009

Related U.S. Application Data

(60) Provisional application No. 60/683,039, filed on May 22, 2005, provisional application No. 60/754,162, filed on Dec. 28, 2005.

(51) Int. Cl.
*G06F 17/30* (2006.01)
(52) U.S. Cl. ............................................. 726/9; 455/558
(58) Field of Classification Search ........................ None
See application file for complete search history.

(56) References Cited

U.S. PATENT DOCUMENTS

| | | | | |
|---|---|---|---|---|
| 5,907,616 | A * | 5/1999 | Brogger et al. | 713/172 |
| 6,108,789 | A | 8/2000 | Dancs | |
| 6,415,160 | B1 * | 7/2002 | Wichmann | 455/558 |
| 2001/0046839 | A1 * | 11/2001 | Latva-Aho et al. | 455/3.05 |
| 2001/0052082 | A1 | 12/2001 | Kinoshita | |
| 2002/0035503 | A1 | 3/2002 | Matsumoto | |
| 2002/0066042 | A1 | 5/2002 | Matsumoto | |
| 2002/0087542 | A1 | 7/2002 | Itabashi | |
| 2003/0224823 | A1 * | 12/2003 | Hurst et al. | 455/558 |
| 2004/0033813 | A1 * | 2/2004 | Sakamura et al. | 455/558 |
| 2005/0059430 | A1 * | 3/2005 | Beeman et al. | 455/558 |

FOREIGN PATENT DOCUMENTS

WO    WO 00/69183    * 11/2000

* cited by examiner

*Primary Examiner* — David J Pearson
(74) *Attorney, Agent, or Firm* — Dergosits & Noah LLP; Geoffrey T. Staniford

(57) ABSTRACT

Modular devices consist of a user-interface shell and a detachable communication cartridge. The shell and cartridge both contain unique serial numbers, user-defined passwords, and secret authentication keys, which can be communicated to cartridges and shells, and to a network. A universal wireless device registry system stores serial numbers of integrated devices, device shells, and device cartridges, and other characteristics associated with devices such as secret keys, passwords, screen size, operating system, service usage, and supply chain information. This registry system is able to track communication devices all around the world and is connected to and shares information with computer servers controlled by service providers, manufacturers, and supply chain companies. When shells and cartridges communicate their numbers to the registry system, the registry system can authenticate shells and cartridges. Service providers can also track and control shells and cartridges (as well as devices) based on information from the registry system. Market research can be done using the information associated with each device on the registry system.

52 Claims, 5 Drawing Sheets

UNIVERSAL DEVICE ID REGISTRY, BACK-END, AND SELF-VERIFICATION ARCHITECTURE

This application claims priority to and incorporates by reference U.S. Patent Application No. 60/683,039 filed May 22, 2005 and U.S. Patent Application No. 60/754,162 filed Dec. 28, 2005.

FIELD OF THE INVENTION

The present invention is generally directed to communication devices, unique ID tags, registry databases, authentication/verification systems, and related apparatus. More particularly, this invention relates to a universal device identification, control, and verification system that tags each device with a collection of unique serial numbers from a worldwide centralized registry, stores these numbers in a back-end database/server system, and provides for communication between the devices and the back-end database system to track usage, control behavior, and verify authenticity of communication devices.

BACKGROUND OF THE INVENTION

Every WWAN (wireless wide area network) or LAN (local area network) device has a serial number that uniquely identifies the device to the network. For WWAN, this number is called the Electronic Serial Number (ESN number) or the International Mobile Equipment Identity (IMEI) number. For LAN, this is called the MAC address. We will refer to any industry-wide registry-based unique serial number (such as ESN, IMEI, MAC, or a new type of number) as an SN in this document.

Device manufacturers embed unique SNs in devices. Each manufacturer is assigned a pool of SNs for exactly this use. When all the SNs are used up by a manufacturer, more SNs can be acquired from the appropriate SN registry. Often this pool of SNs is a range of consecutive numbers.

Wireless operators have SN database systems that keep track of SNs. For example, Verizon Wireless has an SN database system that stores the ESN number of every Verizon Wireless device. The SN database system may also have SNs of devices belonging to roaming partners such as China Unicom. Operators use these SN database systems to, among other things, activate/deactivate devices, track device usage, billing, and block/allow a device's access to the network. However, useful characteristics of the device such as screen size, operating system, and form-factor are not associated with the SNs. Ideally more information such as device type and screen size would be recorded and associated with each SN. This information can be used by operators to tailor services for different device types. The information can also be used for in-depth market research services.

SN database systems are standard specific because the SN registries for different air-interface standards are not the same. For example, CDMA operators use ESN numbers and GSM operators use IMEI numbers. In short, there is no universal SN registry for all communication devices regardless of communication standard. This is acceptable for now since devices for one standard cannot communicate with a network that uses a different standard, but with the advent of multi-mode/multi-standard devices operators must put temporary patches on their back-end systems to handle these cross-standard devices. As dual-mode devices (e.g. —GSM/Wi-Fi and GSM/CDMA) and software-defined radios become more popular, a standard-independent SN registry will be needed.

IPv6 is not the answer because, among other shortcomings, IPv6 only applies to devices with a connection to the Internet, which does not include voice-only handsets or most consumer electronics. Also, the primary purpose of IPv6 is location and addressing (determining the device's location on the worldwide network), not uniquely identifying the device or its characteristics. Therefore, no device characteristics or usage information is associated with IPv6 addresses. This makes market research and operator control based on IPv6 addresses difficult.

Each operator and vendor maintains their own SN database system. However, there is no central database that contains information on all devices across networks and vendors. For example, Verizon Wireless' database system stores a subset of ESN numbers, but not IMEI numbers. Motorola's database system stores ESN and IMEI numbers of devices it has shipped, but not SNs from other manufacturers such as Nokia. Furthermore, these private SN database systems cannot be accessed by outside parties. Therefore, industry-wide market studies on devices are very difficult to perform because the information resides in disparate private databases inside operator and device vendor firewalls. Of high utility would be a universal SN database that has information on all SNs. This universal SN database would get much of its information from various sources such as the company-specific databases maintained by each service provider and vendor. This will enable more global data for market research, and allow operators the ability to track devices on a more universal scale.

When a device makes a connection to a network, the device sends an SN to the network and the network uses an SN database system along with the SN to identify the device. The network uses the SN to track billing and ensure security (blocking a device that is reported as lost or stolen), as well as other tasks. The ability to uniquely identify a device using the SN is critically important to service providers and operators. There is a trend in the communication device industry towards modularization. Traditionally, devices are built by integrating all relevant components on a single PCB. However, to reduce time-to-market and engineering design resources, device vendors have started to use a dual-board device architecture that puts the communication components on a separate PCB from the main device PCB. Such dual-board devices have two parts—the application half (the "shell") that contains an application processor among other components, and the module half (the "cartridge") which contains the communication components. In modular device scenarios the cartridge is a removable card and the two parts are connected via a removable interface. The two parts are able to work together effectively because the interface defines a set of mechanical, electrical, and software specifications the two parts must adhere to. In other scenarios the cartridge is a "Personal Mobile Gateway" (PMG) that the shell connects to via a low power wireless network or a personal access network (PAN), such as Bluetooth, to gain access to a longer-range wireless network, such as GSM. In all cases, a consumer may use many different shells with a cartridge.

A problem arises when communication devices are split into two parts (shell and cartridge). If a device is split into two parts, the SN is attached to the cartridge, leaving the shell ID-less. This means the carrier or manufacturer can monitor the cartridge, but not the different shells that connect to the cartridge. This means most of the control capabilities operators receive through SNs do not exist with modular devices. Therefore, operators will not have as much control over modular devices as they do with integrated devices.

Another problem associated with modular devices relates to interchangeability. Interchangeability between different shells and cartridges is possible because the two parts adhere to strict specifications that almost guarantee interoperability. If one or both of the parts vary from the specification, interoperability between different cartridges and shells is compromised.

Often these interface specifications are published publicly, or at least under a non-disclosure agreement, so that if different vendors design shells or cartridges that conform to the specifications, they will be interoperable. To ensure these parts conform to the specifications, one or more testing organizations may be given the task of testing all new shells and cartridges and certifying that they are indeed compatible with the specification. Cartridges and shells that pass the tests are allowed to put a label on the product or sales packaging that signifies to consumers that the product is certified compatible.

Unfortunately, this compliance method relies on the value of the compatibility label. If consumers are not conditioned to only buy products with the compatibility label, incompatible products may enter the market and lead to poor consumer satisfaction. If rogue vendors put illegal compatibility labels on products that did not pass certification, consumers will also not be satisfied. In markets where inappropriate use of intellectual property is commonplace, ensuring compatibility between shells and cartridges is critical to market acceptance of modular devices.

Instead of using compliance labels to ensure shell/cartridge compatibility, what is needed is a system that allows shells and cartridges to self-police for compatibility when the products are being used together. This would have value to not only communication oriented systems with two parts (cartridge and shell), but any modular interface that requires certification to ensure compatibility (such as those developed by the PCI SIG).

GSM and CDMA networks authenticate devices automatically. In GSM, the network authenticates the SIM card in the device using the A3/A8 algorithms. In CDMA, the network uses the A-Key and CAVE algorithm to authenticate a CDMA device. However, these systems all assume that the device is integrated, not modular with a shell and a cartridge. This means these systems, if used for a modular device, can only authenticate the cartridge—the shell remains unauthenticated.

SNs are used in other industries besides devices. In the consumer goods world, unique serial numbers are also used such as the Electronic Product Code (EPC) for RFID. Each time an EPC is scanned, such as when a product is sold, information about the product is recorded, such as the time and location of sale, etc. This information is aggregated into EPC databases that can be used for market research. For example, a manufacturer can launch an advertising campaign in a certain location and then use an EPC database to track sales increases in the location. Unfortunately, RFID does not track goods after they are sold. So, information such as device usage cannot be collected. Furthermore, RFID does not contain adequate provisions for device authentication. Lastly, RFID tags are usually separate from the product itself and can be removed from the product, circumventing many of the useful characteristics of embedded SNs in devices.

The invention described herein is a device ID and verification system that addresses the shortcomings mentioned above.

SUMMARY OF THE INVENTION

A device may consist of two parts—the application half (the "shell") that may contain an application processor and system software, and the module half (the "cartridge") which may contain communication components such as a protocol stack, baseband, and RF section. The shell stores one or more numbers from the set of unique ID number, user password, and secret authentication key. The cartridge also stores one or numbers from the set of unique ID number, user password, and secret authentication key. The shell and cartridge may be connected with an electro-mechanical interface or a wireless link. These numbers in the shell and cartridge may be stored collectively on a computer system. Product characteristics such as screen size may also be stored and associated with the numbers on this computer system. The computer system may be a database system consisting of at least one database server. The shell and cartridge may have means to communicate their numbers to the computer system over a network. The network may use these numbers to track these products and control them. The network may also use these numbers, or derivations of these numbers, to validate or authenticate shells and cartridges. The computer system may be connected to computers all over the world, including those controlled by service providers, manufacturers, and supply chain companies. The numbers and characteristics in the computer system may be an assimilation of data from at least one of the connected computers.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE INVENTION

Figure 1:
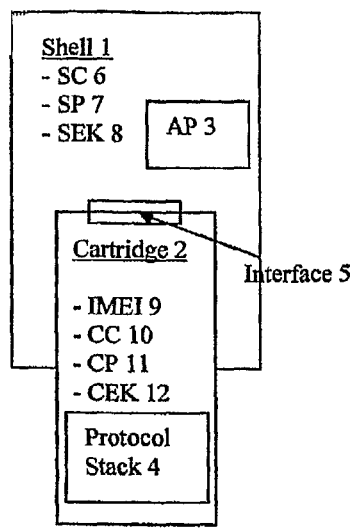
FIG. 1 is a diagram illustrating a device shell with various embedded numbers that is connected to a removable card cartridge with IMEI, CC, CP, and CEK numbers.

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

A device may consist of two parts—the application half 1 (the "shell") that may contain an application processor 3 and/or system software, and the module half 2 (the "cartridge") which may contain communication components such as a protocol stack 4. The communication may be wireless or wired. The shell 1 may also include an antenna, a screen, a keyboard/keypad, a display, a battery, storage memory, a speaker, a microphone, a expansion card slot, a SIM card holder, and/or a close-range wireless subsystem for a technology such as Wi-Fi, Bluetooth, IrDA, UWB, or Zigbee. The cartridge 2 may also include an antenna, a baseband, an RF or modulation section, storage memory, a SIM card holder, a connector to an antenna in the shell, and/or an antenna switch that switches between the cartridge antenna and the shell antenna. If for wired communications, the cartridge 2 may contain a socket for a wire. The cartridge 2 may contain components for connecting to networks that use technologies including but not limited to PHS, GSM, GPRS, EDGE, W-CDMA, UMTS, HSDPA, IS-95, 1xRTT, 1xEV-DO, 1xEV-DV, TD-CDMA, TD-SCDMA, OFDM, WiMax, Wi-Fi, GPS, or any combination of standards thereof. Wired standards such as Fast Ethernet and ATM may also be in the cartridge 2. How these components are integrated into the cartridge is a skill commonly known to those practiced in the art.

In some scenarios the cartridge 2 may be a removable card and the cartridge 2 and shell 1 may be connected via a removable electro-mechanical interface 5 (FIG. 1). This interface 5 may be a pin/socket type (such as PCMCIA), blade-style (such as Mini PCI), or any other type of connector. The interface 5 may have pins that conform to USB, RS-232, PCI, PCM, SDIO, SPI, and/or any other communication interface technology. The interface 5 may include pins for communicating RF signals, analog voice signals, data communication signals, and/or ring signals. The interface 5 may consist of just one connector, or several connectors.

Figure 2:
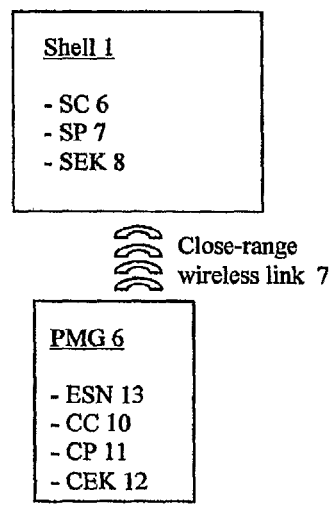
FIG. 2 is a diagram illustrating a device shell with SC, SP, and SEK numbers that is connected wirelessly to a PMG cartridge with ESN, CC, CP, and CEK numbers.

In other scenarios the cartridge 2 may be a personal mobile gateway 6 (PMG) that the shell 1 may connect to via a first wireless link 7 in order to gain access to a communication network (FIG. 2). The first wireless link 7 may be a personal access network (PAN) such as Bluetooth, Zigbee, UWB, IrDA, or any other low-power wireless technology. The communications network 32 may be a cellular or WAN network such as but not limited to PHS, GSM, GPRS, EDGE, W-CDMA, UMTS, HSDPA, IS-95, 1xRTT, 1xEV-DO, 1xEV-DV, TD-CDMA, TD-SCDMA, OFDM, WiMax, Wi-Fi, OPS, Fast Ethernet, ATM, or any combination or standards thereof. IXI Mobile is an example of a company that builds PMGs. Other cartridge form-factors may include a PCB daughter card, a detachable IC, or a dongle.

Figure 3:
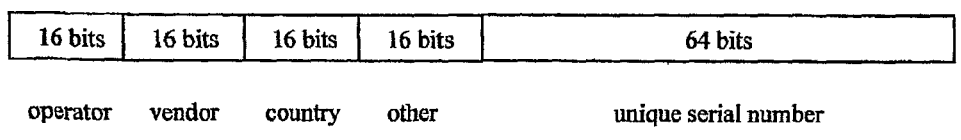
FIG. 3 is a diagram illustrating a sample serial number format.

A serial number ("SN") registry for shells ("shell code or SC registry") separate from the IMEI 9 and ESN 13 registries may be created to specify a SN numbering scheme for shells 1. This SC registry numbering scheme may substantially conform to IPv6 or EPC numbering, or that of another existing numbering scheme, or may be a completely new numbering scheme (FIG. 3). The registry may be common and consistent across all device manufacturers. Shells 1 may include notebook PCs, desktop PCs, PDAs, handsets, automobiles, portable game players, telemetry equipment, appliances, or any other device that needs wireless or wired connectivity. Registry implementations, such as those of IPv6, MAC, IMEI, and EPC are well known to those practiced in the art.

A new SN registry for cartridges ("cartridge code or CC registry") separate from the IMEI 9 and ESN 13 registries may be created to specify a SN numbering scheme for cartridges 2. This CC registry numbering scheme may substantially conform to IMEI, IPv6, or EPC numbering, or that of another existing numbering scheme, or may be a completely new numbering scheme. The registry may be common and consistent across all device manufacturers. Cartridges 2 may be PMGs, USB dongles, expansion cards such as PCMCIA, SDIO, ExpressCard, and CF, embedded cards such as mini-PCI, removable cores such as WIS cards, W-SIM cards, or MobileCards, or any other cartridge embodiment.

An existing number registry such as the EPC, MAC address, or IPv6 may be used for the SC and/or CC registry, which means another number registry need not be created. However, using an existing registry such as IPv6 and MAC may have limitations. IPv6 is mainly for location, not identification, and MAC may be too small of a number space. Alternatively, a new number registry may be created that is separate from existing registries. The SC and CC registries may be as simple as a list of numbers on a sheet of paper or on an electronic spreadsheet, or they may be part of a database system that stores one database record 15 for each SN, and each record 15 has fields that contain, among other things, SC numbers 6, CC numbers 10, IMEI 9, ESN 13, IPv6 addresses, EPC, MAC addresses, manufacturer name, serial number, screen size, form factor, current location, network registration statistics, usage statistics, service provider, browser, operating system, software version, keypad type, and any other device characteristics and/or pertinent information. The SC and CC registries may be the same registry wherein no shell 1 and cartridge 2 will have the same SN, or they may be different registries wherein it is possible that a shell 1 and cartridge 2 may have the same SN. There may be logic embedded in the SC and CC numbering formats that encodes information such as service provider and manufacturer in the number (FIG. 3). For example, if the number has 128-bits, one or more of the bits can specify a service provider and one or more of the other bits can describe a manufacturer. This logic scheme may be similar to IMEI's scheme, which embeds country codes in certain bits in the IMEI 9. The SC and CC registries may also be used for non-modular devices wherein the functionality contained in the shell 1 and cartridge 2 is integrated into a single inseparable device. This allows non-modular devices to include numbers from the SC and CC registries and receive the same benefits as modular devices.

Each shell 1 may include a unique SC number 6 (or just "SC") allocated from the SC registry. Manufacturers of shells may receive an allocation of SCs 6 from the SC registry. For each SC 6 received, the manufacturer may inform the SC registry holder about the characteristics of the shell 1 associated with the SC 6. The SC registry holder may store these characteristics with the SC 6, either in a database, a table, or any other mechanism. Each cartridge 2 may have a unique CC number 10 (or just "CC") allocated from the CC registry. Manufacturers of cartridges may receive an allocation of CCs 10 from the CC registry. For each CC 10 received, the manufacturer may inform the registry holder about the characteristics of the cartridge 2 associated with the CC 10. The CC registry holder may store these characteristics with the CC 10, either in a database, a table, or any other mechanism. The CC registry may also include support for associating cartridge characteristics with IMEI 9, ESN 13, or MAC addresses.

The numbering schemes for the SC 6 and CC 10 may be the same as IMEI 9, ESN 13, MAC (EUI-48 or EUI-64), IPv6 or EPC, or they may define their own new numbering or coding scheme. This new numbering scheme may define 64-bit unique numbers, 128-bit unique numbers, or any other binary size. The numbering scheme may be a binary number, a decimal number, or any other base such as base 8. Each shell 1 may have more than one SC 6 and each cartridge 2 may have more than one CC 10. Or, SCs 6 and CCs 10 from this new numbering scheme may be a combination of two or more numbers. For example, a 128-bit SC 6 or CC 10 may be a combination of a unique 64-bit number and a non-unique 64-bit number that encodes information such as service provider, manufacturer, air-interface standard, country of origin, or other information. The method of encoding such information in numbers is widely known to those skilled in the art. IMEI implements similar coding schemes.

Associated with each SC 6 and CC 10 may be an encryption key (EK), also called an authentication key or secret key. The EK may be embedded in the SC/CC numbering format, or it may be a separate number. The manufacturer may receive the EK when it receives the SC 6 and CC 10 from the registry. Or, the manufacturer may receive the EK from the service provider or other entity separate from the SC/CC registry, in which case the manufacturer may inform the SC/CC registry of the value of the EK once it is received. The EK may be stored along side the associated SC/CC in the registry, and/or it may be kept by the service provider. The EK may be protected in such a manner so that it is not communicated outside the storing mechanism.

Figure 4:
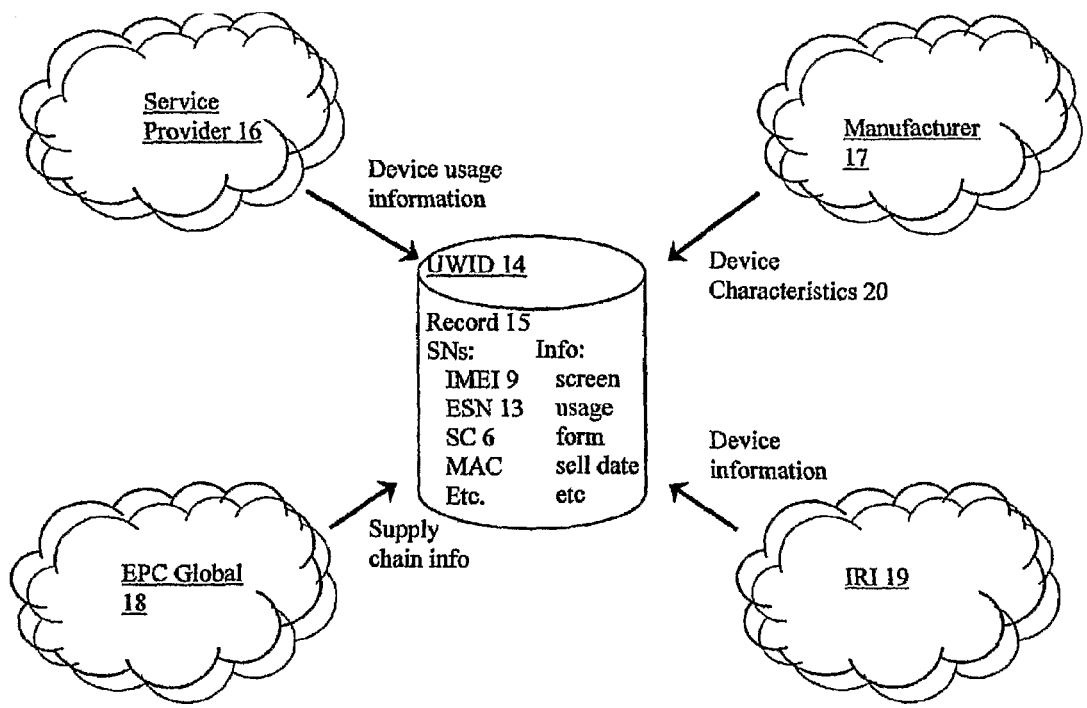
FIG. 4 is a diagram illustrating the architecture of a universal ID database system that holds records corresponding to unique devices. Serial numbers and information are associated with each record.
Figure 5:
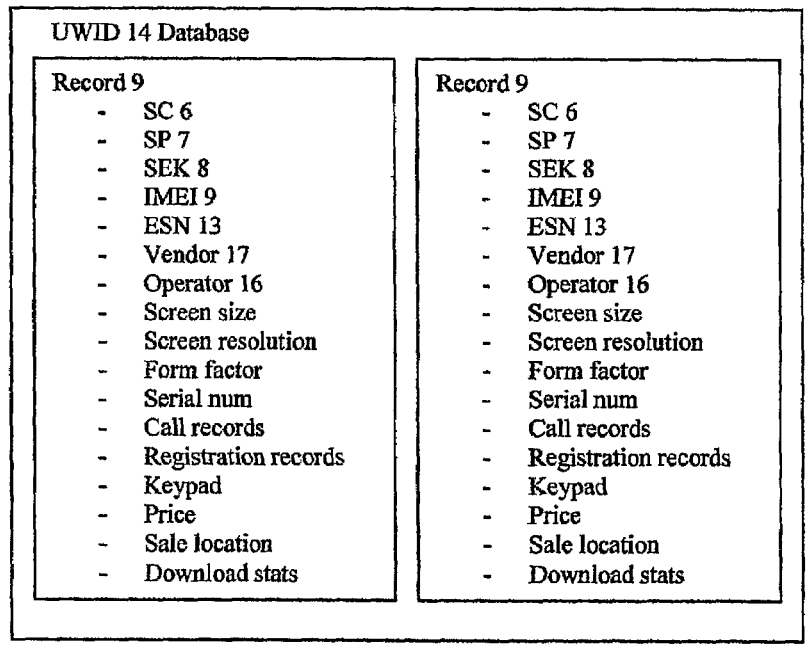
FIG. 5 is a diagram illustrating 2 records in a sample UWID and the corresponding fields.

A universal wireless/wired ID database system 14 (UWID) contains database records 15 (FIG. 4). Each of these records 15 may correlate to a device, shell 1, or cartridge 2. Each record 15 may have at least one field that contains a unique identification number (SN) of a device, shell 1, or cartridge 2. The SN may be IMEI 9, ESN 13, EPC, IPv6, MAC address, SC 6, CC 10, or any other form of unique ID. Each record 15 may also have other fields that store characteristics about the device such as other SNs, manufacturer, service provider, model number, manufacturer serial number, EK, screen size, screen type, screen resolution, operating system, air-interface standard, keypad type, form-factor or any other characteristic of mobile devices, cartridges 2, or shells 1. Each record 15 may also store supply chain information about the device such as current location, date of manufacture, location of manufacture, date and location of sale, sale price, and/or any other kind of supply chain information. Each record 15 may also have fields that store device usage information such as timestamps associated with device network registration, phone calls, data access, downloads, server access, and other usage statistics. The UWID 14 may be as simple as storing records in a spreadsheet or delimited file (FIG. 5), or may be more involved such as storing records 15 in a manner that will allow advanced database functionality to enable sorting, indexing, and analyzing of the information in the records 15. For example, a database system may have the ability to access a record 15 based on any of the fields in the record 15.

The way to construct the UWID 14 can follow one of many implementations that exist in the market. For example, the UWID 14 may be a relational database system based on Oracle, IBM DB2, Solid, mySQL, or any other relational database system running on Unix or a Microsoft OS, or any other operating system. The UWID 14 may be another form of database besides a relational database. HLRs and HSSs implement similar systems for their functionality and these architectures may be used for UWIDs 14.

The UWID 14 may have records 15 that contain an aggregate of information from more than one company. For example the information stored in the UWID records 15 may come from computers or files owned by manufacturers or device vendors 17, distributors, retailers, network operators/service providers 16, EPC databases such as those maintained by EPCGlobal 18, and/or marketing databases such as those maintained by market database firms such as Industrial Research Institute 19 (IRI). The UWID 14 may have data transfer connections 25 to computers at these companies. Information may be transferred to the UWID 14 via data lines 25 from another computer, manual input through a keyboard and screen, importing a file, or any other known method of inputting information into records 15. For example, the device characteristics 20 that a vendor 17 associates with a particular SC 6 or CC 10 may be manually inputted into the UWID 14 by the SC or CC registry custodian or by the vendor 17 itself, or it can be transferred from the vendors systems via a data line 25. In addition, the UWID 14 may have a data connection 25 to computers controlled by service providers 16, distributors, and aggregators. Information may be transferred from the these computers to the UWID 14 over the datalines 25 at set intervals or at set times (e.g. —a certain time daily or weekly). The protocols used by data lines 25 is not important, and may include those commonly used by wireless operators or the Internet 26 such as SS7, ANSI-41, SDLC, HDLC, or TCP/IP. The UWID 14 may have the ability to synchronize the information in its own records 15 with information in other companies' computers so that the information in the UWID 14 and the information in other companies' computers are substantially the same. The information synchronized may a subset of the information contained in each record 15 of the UWID 14 to minimize bandwidth cost or keep certain information secret, The information synchronized may also be a subset of the information stored in the computers of manufacturers 17, service providers 16, or other holders of device-related characteristics 20. The synchronization technique may be one of many methods known in the industry.

In this fashion, the UWID 14 may store information from various sources to become a central database of information on devices around the world. Alternatively, the UWID 14 may be less comprehensive and may be limited to information on wireless devices associated with just one or more service providers 16 and/or one or more vendors 17.

Figure 6:
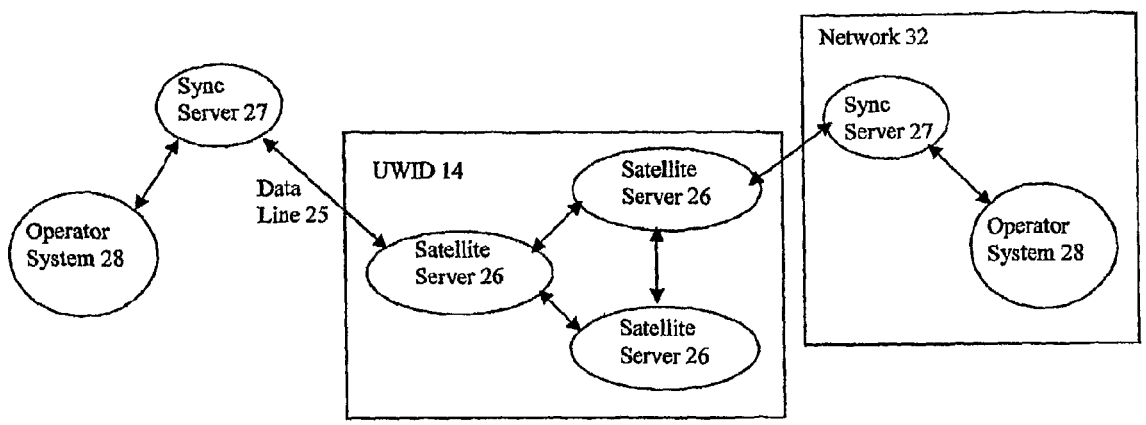
FIG. 6 is a diagram illustrating a topology architecture for a UWID with satellite servers.

The UWID 14 may be a single centrally located computer system, or split up into several connected data centers in different locations. A split-up UWID 14 may adhere to a star topology wherein there is a single central database, and several satellite databases 26 are connected to this central database. Or, a split-up UWID 14 may adhere to a peer-to-peer topology where there is no central database and the satellite databases 26 are connected to each other in a peer-to-peer mesh topology (FIG. 6). Satellite databases 26 may all contain the same information, or they may contain different subsets of information. Satellite databases 26 may be co-located in different network operators' data centers and contain information specific to the operator. These operator satellite databases ("synch servers") 27 may be connected to the operator's own computer systems 28. Such UWID topologies and how to implement them are common to those practiced in the art.

The UWID 14 may behave differently from product databases such as EPC databases in that the UWID 14 may continue to accumulate information on a device, shell 1, or cartridge 2 product even after the product is sold. The UWID 14 may store usage information about a product, such as location and time of use, gathered while the product is connected to the network 32. For example, every time a product registers with a service provider's network 32, the service provider may store time of registration in its own computer systems 28. At periodic times, such registration information may be sent to the UWID 14, and the UWID 14 may store the information in the record 15 associated with the product's SN. Or, a product connected to the network 32 may have direct access to the UWID 14 and usage information may be communicated directly from the product to the UWID 14. Or, the service provider's computer systems 28 may have the primary connection to the product and immediately send the usage information to the UWID 14 as it is gathered rather than waiting for a future time to transfer the information.

If a product downloads an MP3 file from the service provider's server, the service provider may send the information on the MP3 file transaction to the UWID 14 and the UWID 14 may store this transaction information in the record 15 associated with the product. Besides registration time, usage information may also include call logs, data usage logs, file downloads, content usage, or any other information that can be tracked. For example, the UWID 14 may store information on type and frequency of ringtone and video downloads, bandwidth speeds and times for video streaming, gaming behavior, and roaming statistics.

Figure 7:
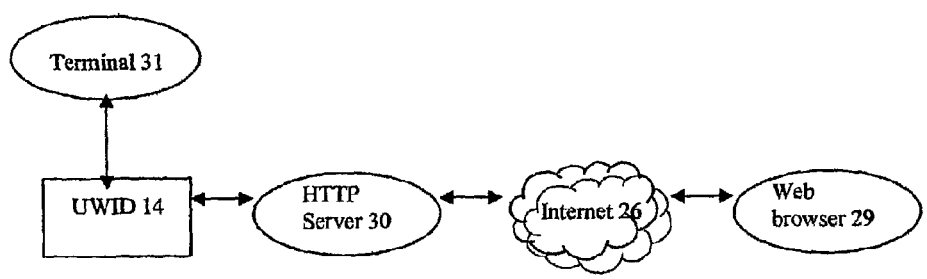
FIG. 7 is a diagram illustrating an architecture for a market research interface into a UWID.

The UWID 14 may be accessible by various entities for doing market research on the distribution, sale, or use of communication products. For example, the UWID 14 may have a Web interface that allows a researcher to type a URL in a Web browser 29 to connect over the Internet 26 to a web server 30 that in turn has access to the UWID 14 (FIG. 7). The Web page may ask the researcher to "login" to access the server 30. After the appropriate login procedures are performed successfully, the researcher may request searches, analytics, graphs, and other data. The server 30 may get the information from the UWID 14 and return it to the researcher. Or, the web server 30 may be the same computer or computer system as the UWID 14. The UWID 14 may also be accessed via a terminal 31 that is directly connected to the UWID via direct data lines. This market research interface and system may be similar to those employed by Lexus Nexus, EPC Global, IRI, or other company that sells information that is stored in databases. If designed correctly, the UWID 14, as a central repository of information on all products, has the potential to be a valuable resource for service providers who want to identify and control communication products and market researchers who want to do research on communication products.

When a shell 1 uses a cartridge 2 to connect to the network 32, the shell may want to communicate its SC 6 or a derivation of the SC to the network 32. This can be done directly or indirectly. For direct SC communication, the shell 1 may send the SC 6 using an SMS message, an IP-based packet, a circuit-data packet, a wireless modem, or any other link available given the communication capabilities of the cartridge 2. For indirect SN communication, the shell 1 may send the SC 6 to the cartridge 2 and the cartridge 2 may communicate the shell's SC 6 or a derivation of the SC to the network 32 using the cartridge's communication capabilities. The network 32 may have a network SN database system that contains records associated with SCs 6. The network SN database system may contain information on all SCs 6, or a subset of all SCs 6. When the network 32 receives the SC 6, it may look up the record associated with the SC 6 in the database. If the network 32 receives a derivation of the SC, it may use an algorithm to determine the SC 6 from the SC derivation before performing the lookup. The network 32 may then store statistical information about the SC 6 in the record such as time or registration and time of de-registration. The network SN database system may send this statistical information to the UWID 14 immediately or at a later time. The network 32 may configure its service to the shell based on information about the SC 6 stored in the record. In some cases, the network SN database system may be substituted by or be part of the UWID 14.

Designed as such, the SC and CC registries in combination with the UWID 14 may be a valuable tool for network operators and service providers 16. Once the network 32 uniquely identifies a particular shell 1 or cartridge 2, it may know all the characteristics and associated information on the unique shell 1. It may then decide to customize services, send software updates, and perform other services and controls based on this knowledge.

Each shell 1 may have a Shell Password 7 (SP) that may be defined by the consumer that uses the shell 1. This SP 7 may also be stored in the UWID 14, in an SP-specific database, or in any other database. The SP 7 may be defined by the consumer or generated automatically at time of shell 1 purchase. The SP 7 may be set or reset after purchase.

Each cartridge 2 may have a Card Password 11 (CP) that may be defined by the consumer that uses the cartridge 2. This CP 11 may also be stored in the UWID 14, in a CP-specific database, or in any other database. The CP 11 may be defined by the consumer at time of cartridge 2 purchase. The CP 11 may be set or reset after purchase.

The shell 1 may contain an encryption or secret key 8 (SEK) whose value never gets communicated outside the shell 1. The cartridge 2 may contain a similar encryption key 12 (CEK) that never gets communicated outside the cartridge 2. Both the shell 1 and cartridge 2 may have encryption or ciphering algorithms that modify the encryption keys 8 12 to create a response key that can be communicated to the outside world while keeping the value of the encryption keys 8 12 secret. The encryption algorithms may use a "challenge number" to create the response key. The challenge number may be randomly generated. The encryption algorithms may use A3, A8, CAVE, or any other ciphering algorithm. The use of encryption algorithms, encryption keys, challenge numbers, and response keys is commonly known to those skilled in the art.

When a cartridge 2 is inserted into a shell 1, the cartridge 2 may send the shell 1 one or more "cartridge validation numbers" (CVNs). The CVN(s) may be the CC 10, the CP 11, and/or a response key associated with the CEK 12. The CVN(s) may be sent upon receipt of one or more query commands from the shell 1 or may be sent automatically upon insertion. The shell 1 may attempt to validate the cartridge 2 using the CVN(s) to decide whether to accept or reject the cartridge 2. If the shell 1 accepts the CVN(s), the shell 1 may continue normal operation with the cartridge 2. If the shell 1 rejects the CVN(s), the shell 1 may limit operation with the cartridge 2, or even shut down. If the cartridge 2 fails to send the CVN(s), the shell 1 may limit operation or shut down. Any limitation of operation and the reason thereof may be communicated to the user of the shell 1.

Similarly, when a cartridge 2 is inserted into a shell 1, the shell 1 may send the cartridge 2 one or more "shell validation numbers" (SVNs). The SVN(s) may be the SC 6, the SP 7, and/or the response key associated with the SEK 8. The SVN(s) may be sent upon receipt of one or more query commands from the cartridge 2, or may be sent automatically upon insertion. The cartridge 2 may attempt to validate the shell 2 using the SVN(s) to decide whether to accept or reject the shell 1. If the cartridge 2 accepts the SVN(s), the cartridge 2 may continue normal operation with the shell 1. If the cartridge 2 rejects the SVN(s), the cartridge 2 may limit operation with the shell 1, or even shut down. If the shell 1 fails to send the SVN(s), the cartridge 2 may limit operation or shut down. Any limitation of operation and the reason thereof may be communicated to the user of the cartridge 2 via the shell 1.

Figure 8:
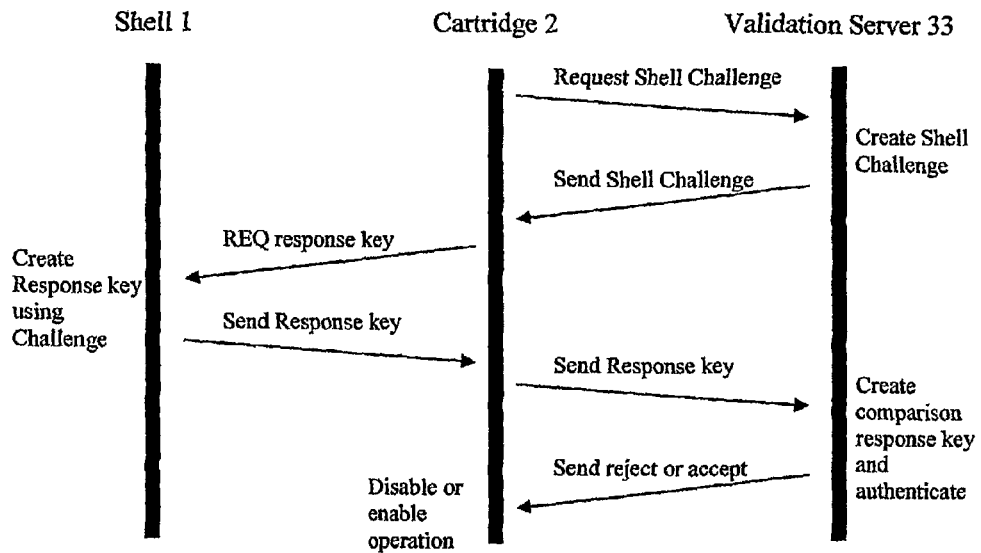
FIG. 8 is a timing diagram illustrating how a shell, cartridge, and validation server communicate to validate the shell.

This validation by the shell 1 or cartridge 2 may happen with the help of the network 32. For shell validation, the cartridge 2 may communicate the SVN(s) to a validation server 33 on the network 32, which may be the network's SC database system, a separate validation server 33 connected to the network 32, the UWID 14, or a separate server connected to the UWID. The validation server 33 may also be a collection of servers. The validation server 33 may then attempt to validate the SVN(s). If the SVN(s) includes a response key, the response key may have been created using a challenge key sent to the cartridge by the validation server 33. As seen in FIG. 8, the cartridge 2 may send a challenge key request to the validation server 33, the validation server 33 may send a challenge key to the cartridge 2, the cartridge 2 may send the challenge key to the shell 1, the shell 1 may create the response key using the challenge key, the shell 1 may send the response key to the cartridge 2, and the cartridge 2 may send the response key to the validation server 33. The validation server 33 may then generate a comparison response key from the challenge key and the SEK stored in the validation server 33, the SC database system, or the UWID 14. This SEK may not be communicated outside of the validation serve 33*r*. The validation server 33 may compare the comparison response key to the SVN response key to validate the shell 1. If the validation succeeds, the validation server 33 may communicate this success to the cartridge 2 and the cartridge 2 may decide whether to validate the shell 1. On the other hand, if the validation fails, the server may tell the cartridge 2 about the validation failure and the cartridge 2 may decide whether to validate or invalidate the shell 1. Or, the validation server 33 may only communicate to the cartridge 2 if the validation fails. If the validation succeeds, there is no communication to the cartridge 2. In this way, the cartridge 2 will only receive a message from the validation server 33 if the shell 1 fails validation. Or, upon validation failure the validation server 33 may tell the network 32 to limit communications with the cartridge 2. These validation/authentication techniques are known to those practiced in the art.

Figure 9:
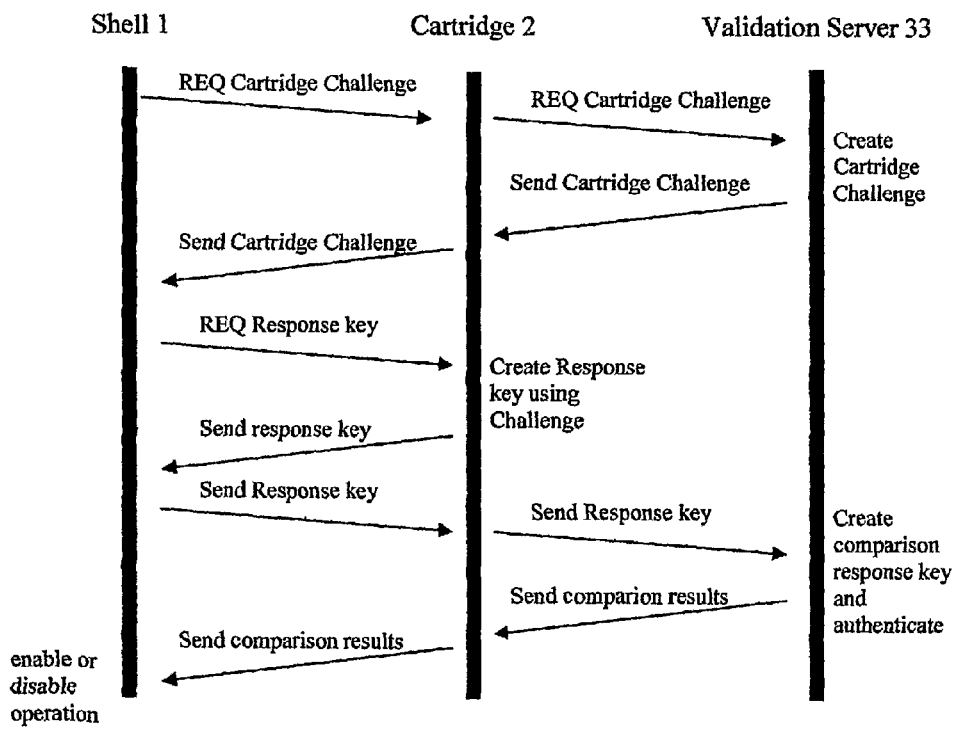
FIG. 9 is a timing diagram illustrating how a shell, cartridge, and validation server communicate to validate the cartridge.

For cartridge validation, the shell 1 may communicate the CVN(s) to a validation server 33 on the network 32, which may be the network's CC database system, a separate validation server 33 connected to the network, the UWID 14, or a separate server connected to the UWID 14. The validation server 33 may also be a collection of servers. The validation server 33 may then attempt to validate the CVN(s). If the CVN(s) includes a response key, the response key may have been created using a challenge key sent to the shell 1 by the validation server 33. As seen in FIG. 9, shell 1 may send a challenge key request to the validation server 33 via the cartridge 2, the validation server 33 may send a challenge key to the shell 1 via the cartridge 2, the shell 1 may send the challenge key to the cartridge 2, the cartridge 2 may create the response key using the challenge key, the cartridge 2 may send the response key to the shell 1, and the shell 1 may send the response key to the validation server 33 via the cartridge 2. The validation server 33 may then generate a comparison response key from the challenge key and the CEK stored in the validation server 33, the CC database system, or the UWID 14. This CEK may not be communicated outside of the validation server 33. The validation server 33 may compare the comparison response key to the CVN response key to validate the cartridge 2. If the validation succeeds, the validation server 33 may communicate this success to the shell 1 (via the cartridge 2) and the shell 1 may decide whether to validate the cartridge 2. On the other hand, if the validation fails, the server may tell the shell 1 about the validation failure and the shell 1 may decide whether to validate or invalidate the cartridge 2. Or, the validation server 33 may only communicate to the shell 1 if the validation fails. If the validation succeeds, there is no communication to the shell 1. In this way, the shell 1 will only receive a message from the validation server 33 if the cartridge 2 fails validation. Or, upon validation failure the validation server 33 may tell the network to limit communications with the cartridge 2. For shell 1 and cartridge validation 2, any other encryption or authentication method besides the response key/secret key method may be used.

In some embodiments it may be desirable to use a response/secret key shell 1 and cartridge 2 validation method without using the network 32. For shell 1 validation, the cartridge 2 may send a challenge key to the shell 1. The shell 1 may create a response key using the challenge key and the shell's SEK 8, and may send the resulting response key to the cartridge 2. The cartridge 2 may compare this response key to the cartridge's comparison key. If the comparison key was created using the same challenge key, the same SEK 8, and the same algorithm, it will be the same as the shell's response key and the cartridge may validate the shell. For cartridge 2 validation, the shell 1 may send a challenge key to the cartridge 2. The cartridge 2 may create a response key using the challenge key and the cartridge's CEK 12, and may send it to the shell 1. The shell 1 may compare this response key to the shell's comparison key. If the comparison key was created using the same challenge key, the same CEK 12, and the same algorithm, it will be the same as the cartridge's response key and the shell 1 may validate the cartridge 2.

Designed as such, a shell 1 may have a tool to ensure that only certified and compatible cartridges 2 can be used with the shell 1. Also, a cartridge 2 may have a tool to ensure that only approved shells 1 can be used with the cartridge 2. This may be far more effective than relying on a compatibility label. In addition, the validation server 33 and UWID 14 may give the service provider the option to control the cartridge 2 or shell 1 based on validation.

Figure 10:
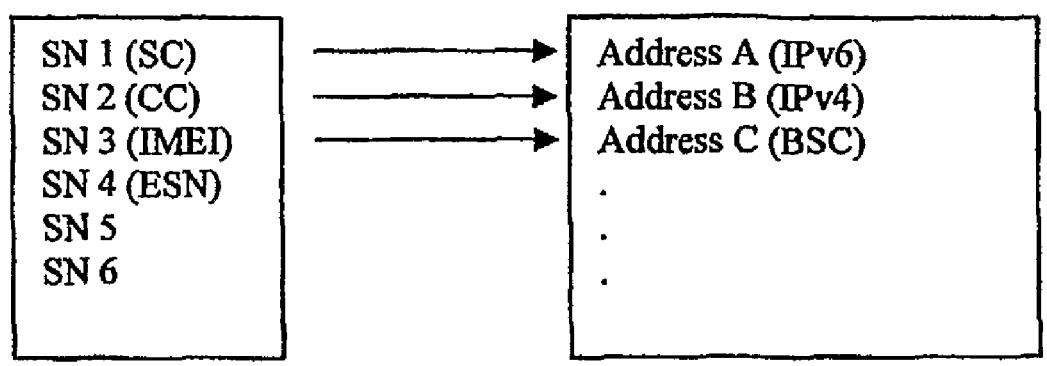
FIG. 10 is a diagram illustrating a lookup table that translates unique ID to location addresses.

A lookup table may be created that associates SNs with a current location address (FIG. 10). For example, in one column there may be a list of SNs of various devices. These SNs may be SCs 6, CCs 10, IMEI 9, ESN 13, or any other unique SN. In another column there may be the location addresses associated with each SN. These addresses may be IPv6, IP4, phone numbers, or any other location-based addressing number. The lookup table may be a simple 2-column list or spreadsheet, or may be as advanced as a database system, wherein a database lookup on a SN will return the corresponding address. The lookup table may be connected to the Internet 26, the UWID 14, a UWID satellite server 26, or an operator's computer system 28. There may be several synchronized mirror lookup tables at different locations around the world. The lookup table may be similar to those used by DNS servers, wherein an IP address is associated with a URL, or it may be a different type of lookup table. Using such a SN lookup table allows location of devices based on the SN—the SN is found in the table, and address associated with the SN in the table is the SN's current location. This is beneficial for mobile devices that can travel all over the world.

What is claimed is:
1. A device shell comprising:
 a detachable interface to a cartridge that contains communication components, at least one of which is selected from the set of a baseband or Radio-Frequency (RF) section for connection to at least one communication network, the cartridge storing a cartridge number that uniquely identifies the cartridge and conforms to a cartridge code registry numbering scheme, wherein the cartridge number is also stored in a cartridge identification database accessible through the at least one communication network;

a shell antenna for wireless communication using the communication components in the cartridge;

a coupling within the detachable interface for connection to an antenna connector in the cartridge, wherein the cartridge includes a cartridge antenna for wireless communication using the communication components in the cartridge, and an antenna switch to select either one of the shell antenna or cartridge antenna when the cartridge is coupled to the shell;

memory storing a shell number comprising a unique serial number that identifies the device shell and conforms to a shell code registry numbering scheme, wherein the shell number is also stored in a database record as part of a shell identification database accessible through the at least one communication network, the database record also storing device characteristics and usage information of the device shell corresponding to the respective shell number and including information regarding communication using the communication components through either the shell antenna or cartridge antenna, wherein the shell identification database stores information relating to manufacturing, distribution, operation, and continuing usage of the device shell, and wherein the information is used for validation of the cartridge and device shell combination; and a processor that obtains the shell number from the memory and the cartridge number from the cartridge when the cartridge is coupled to the device shell through the detachable interface, and transmits the shell number and cartridge number to a validation server that validates operation of the inserted cartridge with the device shell for communication over the at least one communication network.

2. The shell of claim 1 wherein the detachable interface is at least one electro-mechanical connector.

3. The shell of claim 1 wherein the detachable interface is at least one short-range wireless link.

4. The shell of claim 1 wherein the at least one communication network is a wireless network.

5. The shell of claim 1 wherein the shell communicates the shell number to the communication network using the communication components of the cartridge to allow an operator of the communication network to determine the characteristics of the shell and optimize any provided services for the shell.

6. The shell of claim 1 further including casing to enclose the processor and system software.

7. The shell of claim 1 wherein the shell further includes a secret key authentication number.

8. The shell of claim 1 wherein the shell further contains at least one changeable password, wherein said password is also stored on a computer connected to said at least one communication network.

9. The shell of claim 1 wherein the shell has a means to receive at least one validation number from the cartridge, validate said at least one validation number, and limit operation based on the value of the at least one validation number.

10. The shell of claim 9 wherein the means to validate said validation number consists of communicating the validation number to a validation server connected to the at least one communication network.

11. The device shell of claim 1 wherein the device characteristics stored in the database record comprise information selected from the group consisting of: screen size, form factor, service provider, operating system, keypad, and location.

12. The device shell of claim 1 wherein the usage information stored in the database record comprise information selected from the group consisting of: network registration statistics and usage statistics.

13. The device shell of claim 12 wherein the usage information stored in the database record comprises accumulated usage information, and wherein the database record is modified as usage of the device changes.

14. The device shell of claim 13 wherein the usage information is accessible to a network operator of the communication network to facilitate provision of customized services or software updates to the device based on the accumulated usage information.

15. The device shell of claim 1 wherein the cartridge number is stored in a separate database record as part of the cartridge identification database system on the computer, the separate database record also storing device and usage characteristics of the respective cartridge inserted in the device shell.

16. The device shell of claim 1 further comprising a SIM (Subscriber Identity Module) for placement of a SIM card in the device shell.

17. A wireless cartridge comprising:

communication components, at least one of which comes from the set of baseband and RF section, for connection to at least one communication network;

memory storing a cartridge number that uniquely identifies the cartridge and conforms to a cartridge code registry numbering scheme, wherein the cartridge number is also stored in a cartridge identification database accessible through the at least one communication network;

a detachable interface for connection to a device shell, the device shell having a shell antenna for wireless communication using the communication components in the cartridge, and storing a shell number comprising a unique serial number that uniquely identifies the device shell and conforms to a shell code registry numbering scheme, wherein the shell number is also stored in a database record as part of a shell identification database accessible through the at least one communication network, wherein the shell identification database stores information relating to manufacturing, distribution, operation, and continuing usage of the device shell, and wherein the information is used for validation of the cartridge and device shell combination;

a cartridge antenna for wireless communication using the communication components in the cartridge;

an antenna switch to select either one of the shell antenna or cartridge antenna when the cartridge is coupled to the shell;

a means to receive the shell number from the device shell, and;

a means to transfer the shell number and the cartridge number to a validation server that validates operation of the cartridge with the device shell for communication over the at least one communication network.

18. The cartridge of claim 17 wherein the detachable interface is at least one electro-mechanical connector.

19. The cartridge of claim 17 wherein the detachable interface is at least one short-range wireless link.

20. The cartridge of claim 17 wherein the at least one communication network is a wireless network.

21. The cartridge of claim 17 wherein the cartridge number is stored in a separate database record as part of a cartridge identification database system on the computer, the separate database record also storing device and usage characteristics of the respective cartridge inserted in the device shell.

22. The cartridge of claim 17 wherein the cartridge further includes at least one changeable password, wherein said password is also stored on a computer connected to said at least one communication network.

23. The cartridge of claim 17 wherein the cartridge has further means to receive at least one validation number from the shell, validate said at least one validation number, and limit operation based on the value of the at least one validation number.

24. The cartridge of claim 23 wherein the means to validate said validation number includes communicating the validation number to a validation server connected to the at least one communication network.

25. The wireless cartridge of claim 17 further comprising a SIM (Subscriber Identity Module) for placement of a SIM card in the wireless cartridge.

26. A modular communication device comprising:
a communication cartridge with communication components, at least one of which comes from the set of baseband and RF section, for connection to at least one communication network, a cartridge antenna for wireless communication using the communication components, an antenna switch for selecting between the cartridge antenna and a shell antenna, the cartridge storing a cartridge number that uniquely identifies the cartridge and conforms to a cartridge code registry numbering scheme, wherein the cartridge number is also stored in a cartridge identification database accessible through the at least one communication network;
a device shell with non-communication components, the device shell having the shell antenna for wireless communication using the communication components of the cartridge, storing a shell number comprising a serial number that uniquely identifies the device shell and conforms to a shell code registry numbering scheme, wherein the shell number is also stored in a database record as part of a shell identification database accessible over the at least one communication network, wherein the shell identification database stores information relating to manufacturing, distribution, operation, and continuing usage of the device shell;
a detachable interface that connects the shell and cartridge;
cartridge validation means to allow the shell to validate the cartridge number when the cartridge is connected to the shell through the detachable interface; and
shell validation means to allow the cartridge to validate the shell number when the cartridge is connected to the shell through the detachable interface, and wherein the shell number and cartridge number are transmitted to the communication network using the communication components of the cartridge to allow an operator of the communication network to determine the characteristics of the shell and cartridge as indexed through the shell identification database and cartridge identification database to validate operation of the shell and cartridge combination.

27. The device of claim 26 wherein the detachable interface is at least one electro-mechanical connector.

28. The device of claim 26 wherein the detachable interface is at least one short-range wireless link.

29. The device of claim 26 wherein the at least one communication network is a wireless network.

30. The device of claim 26 wherein the shell has means to communicate the serial number to the cartridge.

31. The device of claim 26 wherein the device further contains a secret key authentication number.

32. The device of claim 26 wherein the device further contains at least one changeable password, wherein said password is also stored on a computer connected to said at least one communication network.

33. The device of claim 26 wherein the shell validation means includes means to receive at least one validation number from the cartridge, validate said at least one validation number, and limit operation based on the value of the at least one validation number.

34. The device of claim 33 wherein the validation number consists of communicating the validation number to a validation server connected to the at least one communication network.

35. The device of claim 26 wherein the cartridge has a means to receive at least one validation number from the shell, validate said at least one validation number, and limit operation based on the value of the at least one validation number.

36. The device of claim 35 wherein the means to validate said validation number consists of communicating the validation number to a validation server connected to the at least one communication network.

37. A device serial number registry system comprising:
means for storing a cartridge number for a communication cartridge with communication components, at least one of which is selected from a baseband or RF section, for connection to at least one communication network, a cartridge antenna for wireless communication using the communication components, an antenna switch for selecting between the cartridge antenna and a shell antenna, wherein the cartridge number uniquely identifies the cartridge and conforms to a cartridge code registry numbering scheme;
means for storing a shell number for a device shell with non-communication components, the device shell having the shell antenna for wireless communication using the communication components of the cartridge, the shell number comprising a serial number that uniquely identifies the device shell and conforms to a shell code registry numbering scheme,
wherein the shell number is stored in a database record as part of a shell identification database and the cartridge number is stored in another database record as part of a cartridge identification database, wherein the shell and cartridge identification databases store information relating to manufacturing, distribution, and continuing usage information for the respective shell and cartridge;
means to receive the shell number and cartridge number as transmitted to the communication network using the communication components of the cartridge; and
means to validate operation of the combined shell and cartridge combination through use of the information stored in the shell and cartridge identification databases as indexed through the shell and cartridge numbers.

38. The device serial number registry system of claim 37 wherein said server also stores at least one cartridge number that is embedded in a cartridge with communication components, at least one of which comes from the set of protocol stack software, baseband, and RF section, for connection to at least one communication network.

39. The registry system of claim 38 wherein the at least one cartridge number is a MAC address, ESN number, or IMEI number.

40. The device serial number registry system of claim 37 wherein the device characteristics stored in the database record comprise information selected from the group consisting of: screen size, form factor, service provider, operating system, keypad, and location.

41. The registry system of claim 40 wherein the usage information stored in the database record comprise information selected from the group consisting of: network registration statistics and usage statistics.

42. The registry system of claim 40 wherein the at least one computer-based server has a means to receive a number from a shell and authenticate said shell based on the device characteristics associated with the number.

43. The registry system of claim 40 wherein one of the characteristics is a secret key.

44. The registry system of claim 43 wherein the at least one computer-based server has a means to receive a response key from a shell and authenticate said shell based on comparing the response key to a derivation of the secret key.

45. The registry system of claim 37 wherein the shell number is a MAC address, ESN number, or IMEI number.

46. The registry system of claim 37 wherein the at least one computer-based server has a means to receive a number from a shell and authenticate said shell based on the number.

47. The registry system of claim 38 wherein the at least one computer-based server has a means to receive a number from a cartridge and authenticate said cartridge based on the number.

48. A computer-implemented method of creating a device serial number registry system, comprising:
   retrieving from a shell memory, a shell number conforming to a shell code registry numbering scheme and uniquely identifying a shell detachably coupled to a cartridge, the shell having non-communication components and a shell antenna for wireless communication using the communication components of the cartridge, the cartridge containing communication components for connection at least one communication network, the cartridge storing a cartridge number uniquely identifying the cartridge and conforming to a cartridge code registry numbering scheme, the cartridge further having a cartridge antenna for wireless communication using the communication components and an antenna switch for selecting between the cartridge antenna and a shell antenna;
   storing, in a shell identification database, the shell number coded in a database record that also stores device characteristic and usage information for the shell:
   storing, in a cartridge identification database, the cartridge number coded in another database record; and
   allowing access by an operator of a validation server to the shell number and cartridge number to determine the compatibility of the shell and cartridge as indexed through the shell identification database and cartridge database.

49. The method of claim 48 wherein such computers systems are controlled by device manufacturers.

50. The method of claim 48 wherein such computers systems are controlled by service providers.

51. The method of claim 48 wherein such computers systems are controlled by supply chain companies.

52. The method of claim 48 further including the step of obtaining market research data based on the characteristics.

* * * * *